(12) United States Patent
Schmier et al.

(10) Patent No.: US 12,412,257 B2
(45) Date of Patent: Sep. 9, 2025

(54) ANOMALY MONITORING FOR TECHNICAL SYSTEMS BASED ON THE COMPATIBILITY OF IMAGE DATA WITH A PREDEFINED DISTRIBUTION

(71) Applicant: Robert Bosch GmbH, Stuttgart (DE)

(72) Inventors: Robert Schmier, Heidelberg (DE);
Christoph-Nikolas Straehle, Weil der Stadt (DE); Dan Zhang, Leonberg (DE); Ullrich Koethe, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 280 days.

(21) Appl. No.: 17/823,988

(22) Filed: Sep. 1, 2022

(65) Prior Publication Data

US 2023/0074862 A1    Mar. 9, 2023

(30) Foreign Application Priority Data

Sep. 6, 2021   (DE) ...................... 10 2021 209 805.3

(51) Int. Cl.
*G06T 7/00*      (2017.01)
*G06V 10/74*     (2022.01)
(Continued)

(52) U.S. Cl.
CPC .......... *G06T 7/0002* (2013.01); *G06V 10/761* (2022.01); *G06V 20/58* (2022.01);
(Continued)

(58) Field of Classification Search
CPC ......... G06T 7/0002; G06T 2207/20081; G06T 2207/20084; G06T 2207/30261;
(Continued)

(56) References Cited

U.S. PATENT DOCUMENTS

2020/0265318 A1*  8/2020  Malkiel .................. G06N 3/047
2022/0188978 A1*  6/2022  Hu ......................... G06T 11/008

FOREIGN PATENT DOCUMENTS

DE    102019209227 A1    12/2020
DE    102020211214 A1    3/2022
(Continued)

OTHER PUBLICATIONS

Kingma, D. et al. "Glow: Generative Flow with Invertible 1 x1 Convolutions", 2018. URL: https://arxiv.org/abs/1807.03039.
(Continued)

*Primary Examiner* — Jerome Grant, II
(74) *Attorney, Agent, or Firm* — NORTON ROSE FULBRIGHT US LLP (57) ABSTRACT

A method for detecting anomalies in input image data, in particular from a camera, by detecting to what extent the input image data match at least one predefined distribution of image data or deviate from this predefined distribution. In the method: at least one transformation is provided, which maps input image data to data that have been information-reduced with regard to at least one aspect; at least one neural reconstruction network is provided, which is trained to reconstruct original image data from information-reduced data, which were obtained by applying the transformation to original image data from the predefined distribution; the input image data are mapped to information-reduced data by applying the transformation; the information-reduced data are mapped to reconstructed image data using the neural reconstruction network; the reconstructed image data are used to assess to what extent the input image data match or deviate from the predefined distribution.

16 Claims, 2 Drawing Sheets

(51) Int. Cl.
*G06V 20/58* (2022.01)
*B60W 50/14* (2020.01)

(52) U.S. Cl.
CPC ....... *B60W 50/14* (2013.01); *B60W 2420/403* (2013.01); *G06T 2207/20081* (2013.01); *G06T 2207/20084* (2013.01); *G06T 2207/30261* (2013.01)

(58) Field of Classification Search
CPC ........ G06T 3/40; G06V 10/761; G06V 20/58; G06V 10/82; G06V 20/56; B60W 50/14; B60W 2420/403
USPC ......................................................... 382/104
See application file for complete search history.

(56) References Cited

FOREIGN PATENT DOCUMENTS

| DE | 102020126554 A1 | | 4/2022 | | |
|---|---|---|---|---|---|
| IN | 201941016418 | * | 10/2020 | ............... | G06K 9/42 |
| WO | WO2023/279316 | * | 1/2023 | ............... | G06T 5/00 |

OTHER PUBLICATIONS

Pang, et al.: "Deep Learning for Anomaly Detection: A Review," ACM Computing Surveys (CSUR), 1(1), (2020), pp. 1-36. URL:https://arxiv.org/pdf/2007.02500.

Xia, et al.: "Synthesize then Compare: Detecting Failures and Anomalies for Semantic Segmentation," (2003), arXiv, Mar. 18, 2020, URL: https://arxiv.org/pdf/2003.08440v1, pp. 1-17.

* cited by examiner

ANOMALY MONITORING FOR TECHNICAL SYSTEMS BASED ON THE COMPATIBILITY OF IMAGE DATA WITH A PREDEFINED DISTRIBUTION

CROSS REFERENCE

The present application claims the benefit under 35 U.S.C. § 119 of German Patent Application No. DE 10 2021 209 805.3 filed on Sep. 6, 2021, which is expressly incorporated herein by reference in its entirety.

FIELD

The present invention relates to a method for detecting anomalies in technical systems. This identification is attributed to a check on whether image data, which are to be processed by a neural network of the technical system, are covered by the scope of the training that this neural network has undergone.

BACKGROUND INFORMATION

In the same way as human drivers, driving assistance systems and systems for at least partially automated driving use image data from the vehicle's environment as an essential source of information. Neural networks are widely employed for processing these image data. If these neural nets are trained using a sufficient variety of training image data, they are then able to draw the correct conclusions from the image data for control of the vehicle even in a large number of situations that have not been seen in the training.

However, this ability is limited to image data which match a distribution defined by the training image data. If, for example, the network is trained to classify traffic-relevant objects, it will, under a large number of conditions, reliably detect vehicles, traffic signs, roadway boundaries, and many other objects which regularly occur in traffic situations. On the other hand, a sofa, which has come loose during transport owing to defective load securing, and is lying in the middle of the freeway, has not occurred in the training, and will not be identified as such. In this case, it is not guaranteed that a vehicle being controlled by the neural network will brake and/or swerve in a timely manner.

German Patent Application No. DE 10 2019 209 227 A1 describes a method which may be used to check any situations characterized by input variable values with regard to whether the relationships learned during the training of a neural network are applicable to these situations.

SUMMARY

According to the present invention, a method is provided for detecting to what extent input image data match at least one predefined distribution of image data or deviate from this predefined distribution. This detection allows a detection of anomalies in the input image data, and thus also a detection of anomalies in a technical system which processes these input image data. The image data may in particular be recorded using any form of camera, for example. They may represent still images, for example, or sequences of images.

Within the framework of the method, at least one transformation is provided, which maps input image data to data that have been information-reduced with regard to at least one aspect. In this context, the term "information-reduced" is to be understood in particular as meaning that the transformation is not clearly reversible. The transformation may therefore provide, for example, a clear way of scaling down an image to a lower resolution or converting a color image to a grayscale image. However, no clear way back to a specific image with the higher resolution, or a specific color image, can be derived therefrom.

At least one neural reconstruction network is provided. This reconstruction network is trained to reconstruct original image data from information-reduced data, which were obtained by applying the transformation to original image data from the predefined distribution.

The input image data are mapped to information-reduced data by applying the transformation. The information-reduced data are mapped to reconstructed image data using the neural reconstruction network.

These reconstructed image data are used to assess to what extent the input image data match the predefined distribution or deviate from this distribution.

It was identified that the neural reconstruction network's ability to reconstruct the input image data from the information-reduced data is subject to a match between the information-reduced data that have been input into this reconstruction network and the distribution of the data on which the reconstruction network has been trained. The reconstruction network may therefore be trained, for example, to reconstruct the respective original starting from a large number of information-reduced versions of image data from the predefined distribution. Information-reduced data that correspond to image data from the same distribution are mapped to similarly good reconstructions of the originals in this case. Information-reduced data that correspond to image data far beyond this distribution, on the other hand, are mapped to reconstructions which no longer have a great deal in common with the input image data. It is precisely this that makes it possible to detect which input image data match the predefined distribution and which do not.

For example, a reconstruction network may be trained to recover the high-resolution original from image data that have been scaled down with regard to their resolution. For this purpose, for example, information-reduced data may be used which were obtained by scaling down image data of lengths of textured fabric. The reconstruction network will then learn to recover the original associated with the scaled-down image data, especially by restoring a fine fabric texture. For information-reduced images showing lengths of fabric, this is indeed correct. However, if the reconstruction network that has been trained in this way is now presented with an information-reduced image of a dry-stone wall, the reconstructed image data likewise contain a fine fabric texture, which has no place on a dry-stone wall.

The nature of the transformation with which the information-reduced data were generated may be used here to control the type of deviations being sought between the input image data on the one hand and the predefined distribution on the other hand. In the end, therefore, there does not have to be only a digital statement of the type "matches or does not match the predefined distribution". Instead, a differentiated statement of the type "matches the predefined distribution with respect to the examined aspects 1, 2, 3, 5 through 7, and 9, but does not match with respect to the aspects 4 and 8" may be obtained. This in turn allows a differentiated prognosis of the extent to which downstream systems will be affected by the fact that image data deviate from the distribution of the training image data with respect to certain aspects.

If, for example, a traffic situation is bathed in daylight having a particular coloration owing to a rare weather phenomenon, which did not occur for an image classifier during the recording of the training images, a reconstructed color image may be obtained by converting an input image of this traffic situation to a grayscale image and reconstructing the colors using the reconstruction network. However, the reconstruction network here will map the grayscale levels to colors from the distribution that it has learned during the preceding training, and not to colors beyond this distribution, which it has never seen. The reconstruction therefore has a coloration that is distinctly different from the input image. In this way, it may be identified that the colors in the input image clearly deviate from the colors learned previously. A driving assistance system or a system for at least partially automated driving is able to draw the conclusion therefrom that, for example, because of the unusual light conditions, the judgment of the traffic situation based on color information is possibly unreliable, and the judgment should instead be supported by other aspects that are independent of the light conditions, such as shapes of objects.

In addition to scaling down to a lower resolution and removing color information, as discussed above, many other transformations may also be used to check the compatibility of input image data with a predefined distribution with respect to completely different aspects.

For instance, by sorting pixels according to brightness values, deviations of the input image from the predefined distribution with respect to shapes of objects may be identified.

By modifying (e.g., masking) randomly selected pixels, deviations of the input image from the predefined distribution with respect to local image errors may be identified.

By adding image contents (e.g., in the form of image "patches"), deviations of the input image from the predefined distribution with respect to spatial symmetries may be identified.

By leveling differences in brightness, e.g. by dividing by a weighted pixel sum, deviations of the input image from the predefined distribution with respect to the image brightness may be identified.

By aggregating image information over spatial sub-areas of the image data, e.g. by adding up pixel values over entire rows or columns, deviations of the input image from the predefined distribution with respect to spatial distributions of image properties may be identified.

By removing image information items selected according to a predefined criterion, such as the image background, deviations of the input image from the predefined distribution with respect to this part of the image (i.e. for instance with respect to the background) may be identified.

By selecting and centering an image portion from the image data, deviations of the input image from the predefined distribution with respect to the positions of objects in the image may be identified.

As describe above, completely different aspects of a compatibility with the predefined distribution may be examined for the same input image data. For this purpose, in one advantageous embodiment of the present invention, a plurality of information-reduced versions may be generated from the same input image data by applying different transformations. Each information-reduced version may then be mapped to a reconstructed version using the neural network corresponding to the respective transformation. The reconstructed versions thus obtained may be included in the assessment of the extent to which, i.e., the examined aspects with respect to which, the input image data match the predefined distribution or deviate from this distribution.

In one particularly advantageous embodiment of the present invention, a generative neural reconstruction network is selected. The generating of reconstructed image data is then conditioned on the information-reduced data. A generative network translates input data from a predefined domain, such as vectors or matrices of a certain dimension, into data of a certain domain, here reconstructed image data. The input data may be selected randomly from the predefined domain, for example. "Conditioning" is understood to mean that the reconstructed image matches the information-reduced data according to any given criterion. For instance, a reconstruction network that translates grayscale images back into color images translates a grayscale image into not just any color image, but into a color image that contains the same objects as the grayscale image.

Examples of generative neural reconstruction networks are normalizing flows (e.g., Glow https://arxiv.org/abs/1807.03039), decoders of encoder-decoder structures trained as autoencoders, and energy-based models.

In a further particularly advantageous embodiment of the present invention, a generator which has been trained together with a discriminator as a generative adversarial network, GAN, is selected as the neural reconstruction network. Training jointly with a discriminator ensures that the image data generated are in each case particularly realistic.

Furthermore, the discriminator used for training the generator may also be utilized within the framework of the assessment of the reconstructed image data. For this purpose, a score ascertained by the discriminator for reconstructed image data is included in the assessment. This score may indicate, for example, to what extent the discriminator assigns an image to the "reconstructed image" class or the "input image" class.

In one advantageous embodiment of the present invention, based on a comparative assessment of the reconstructed image data on the one hand and the input image data on the other hand, an evaluation is made of the extent to which the input image data match the predefined distribution or deviate from this distribution. A comparison of the input image data with the reconstructed image data may take place using any metrics. For example, the comparative assessment may comprise a measure of the similarity between the reconstructed image data and the input image data. One example of a similarity measure is the L2 norm. However, scores which the discriminator assigns to the reconstructed image data on the one hand and to the input image data on the other hand may also be compared with each other, for example. This comparison does not have to be performed on the pure image data but may also be computed on extracted features (e.g., by SimCLR or SIFT). In other words, the comparative assessment may comprise a measure of the similarity between the reconstructed image data in a pre-learned feature space.

In a further advantageous embodiment of the present invention, the neural reconstruction network is further trained with the input image data. This further training may take place, for example, with the input image data only, or with a batch of image data which always also contains the input image data. After this training, the information-reduced image data are mapped to further reconstructed image data using the further-trained neural reconstruction network. These further reconstructed image data are also included in the assessment.

In particular, it may be assessed in this case whether these further reconstructed image data come closer to the input image data than the reconstructed image data ascertained without the additional training. If this is the case, then the reconstruction network trained only on the predefined distribution was still somewhat unsuitable for the reconstruction but supplied a better reconstruction after it had additionally seen the input image data (and, if applicable, the information-reduced version thereof) during training. This means that the input image data do not match the predefined distribution on which the reconstruction network was originally trained.

In a further particularly advantageous embodiment of the present invention, a distribution of image data on which at least one neural production network has been trained in a predefined image classifier, driving assistance system, robot, system for at least partially automated driving or system for the visual monitoring of areas is selected as the predefined distribution. The name "production network" here does not imply any special requirements of this network, but merely expresses the fact that it is a network other than the reconstruction network, and also serves another purpose. Its purpose is to map image data to outputs (such as classification scores or semantic segmentations), on the basis of which the respective technical system can then be controlled. Image data provided for processing in this sense are selected as input image data, and are therefore checked, within the framework of the method described here, as to whether they match the predefined distribution.

In this way, it may be established while the respective system is operating whether the currently available input image data are image data for the processing of which the production network has been trained. If this is the case, the probability is high that the production network is supplying meaningful outputs and the respective system utilizing these outputs is running without errors.

In response to the fact that the input image data are considered to match the predefined distribution, therefore, a control signal may be ascertained from the output of the production network for these input image data. The image classifier, the driving assistance system, the robot, the system for at least partially automated driving or the system for the visual monitoring of areas may then be controlled using this control signal.

If, on the other hand, the currently available input data lie outside the distribution on which the production network has been trained, a detailed analysis may take place of the reason for this and of how it will affect the operation of the system. The image classifier, the driving assistance system, the robot, the system for at least partially automated driving or the system for the visual monitoring of areas may then be controlled using this control signal.

For this purpose, in a further advantageous embodiment of the present invention, in response to the fact that the input image data are assessed as deviating from the predefined distribution, it is checked whether the transformation used corresponds to a property of the input image that is relevant in the context of applying the production network. If this is the case, various stepped responses are possible to ensure the operating safety of the system.

For example, using the production network, a warning may be issued to a user of the respective system. The system may also, for example, be caused to activate at least one additional sensor and to use measurement data ascertained using this sensor for a plausibility check and/or correction of an output of the production network. If, for instance, a low sun is shining directly into one of the cameras on the vehicle and pushing the intensity values of the images supplied by this camera towards saturation, images from other cameras may possibly be utilized, which view the scene from a different angle and are not affected by the problem to the same extent.

It is also possible, for example, for an output of the production network to be suppressed for those input image data that deviate from the predefined distribution. In particular, temporary disruptions to the image recording may be bridged in this way.

As the most severe escalation step, the system may be deactivated using the production network. A driving assistance system or a system for at least partially automated driving may then, for example, return control to a driver of the vehicle, or bring the vehicle to a halt on a pre-planned emergency stop trajectory.

Furthermore, in response to the fact that the input image data are assessed as deviating from the predefined distribution, these input image data may be earmarked for a further training of the production network. For the ongoing maintenance of the production network, therefore, a "suggestion box" may be run for situations in which the input image data deviate from the predefined distribution. A further training of the production network is then able to concentrate on those precise situations in which such deviations frequently occur.

According to example embodiments of the present invention, the method may in particular be completely or partially computer-implemented. The present invention therefore also relates to a computer program comprising machine-readable instructions, which, when they are executed on one or more computers, cause the computer or computers to execute the method described. Control devices for vehicles and embedded systems for technical devices, which are likewise capable of executing machine-readable instructions, are also to be regarded as computers in this sense.

The present invention likewise relates to a machine-readable data carrier and/or a download product comprising the computer program. A download product is a digital product that may be transmitted over a data network, i.e., is downloadable by a user of the data network, and may be offered for sale, for example, in an online store for immediate download.

Furthermore, according to an example embodiment of the present invention, a computer may be equipped with the computer program, with the machine-readable data carrier, and/or with the download product.

Further measures improving the present invention are presented in greater detail below together with the description of the preferred exemplary embodiments of the present invention with reference to figures.

DETAILED DESCRIPTION OF EXAMPLE EMBODIMENTS

Figure 1:
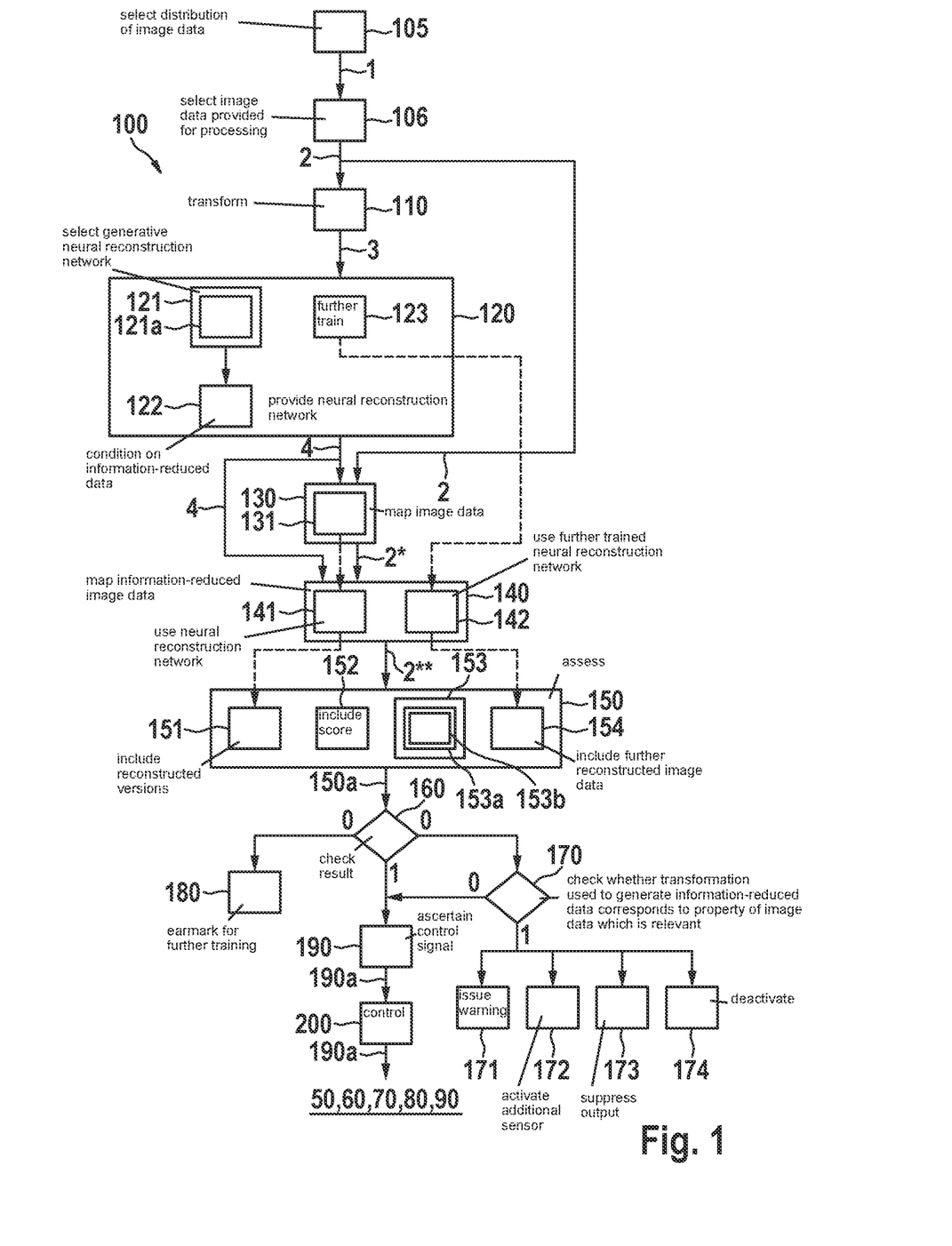
FIG. 1 shows an exemplary embodiment of the method 100 for detecting to what extent input image data 2 match a predefined distribution 1, according to the present invention.

FIG. 1 is a schematic flow chart of an exemplary embodiment of the method 100 for detecting to what extent input image data 2 match a predefined distribution 1.

In step 105, a distribution of image data on which at least one neural production network has been trained in a predefined image classifier 50, driving assistance system 60, robot 70, system 80 for at least partially automated driving or system 90 for the visual monitoring of areas, is selected as predefined distribution 1.

In step 106, image data provided for processing by the production network are selected as input image data 2.

In step 110, at least one transformation 3 is provided, which maps input image data 2 to data 2* that have been information-reduced with respect to at least one aspect.

In step 120, at least one neural reconstruction network 4 is provided, which is trained to reconstruct original image data from information-reduced data, which were obtained by applying transformation 3 to original image data from predefined distribution 1.

According to block 121, in particular, for example, a generative neural reconstruction network 4 may be selected here. According to block 121*a*, in particular a generator which has been trained together with a discriminator as a generative adversarial network, GAN, may be selected.

According to block 122, the generating of reconstructed image data 2* may then be conditioned on information-reduced data 2*. A generator may, for example, map vectors with random values to image data in the domain of reconstructed image data 2* with the constraint that these reconstructed image data 2* must match information-reduced data 2*.

In step 130, input image data 2 are mapped to information-reduced data 2* by applying transformation 3.

In step 140, information-reduced data 2* are mapped to reconstructed image data 2* using neural reconstruction network 4.

In step 150, reconstructed image data 2* are used to assess to what extent input image data 2 match predefined distribution 1 or deviate from this distribution 1.

According to block 131, by applying different transformations 3 a plurality of information-reduced versions 2* may be generated from the same input image data 2. Each of these information-reduced versions 2* may then be mapped to a reconstructed version 2* according to block 141 using the neural reconstruction network 4 corresponding to the respective transformation 3. All these reconstructed versions 2* may then be included in the assessment 150 of the extent to which input image data 2 match predefined distribution 1, according to block 151.

According to block 123, neural reconstruction network 4 may be further trained using input image data 2. According to block 142, information-reduced data 2* may then be mapped to further reconstructed image data 2* using further-trained neural reconstruction network 4. These further reconstructed image data may then likewise be included in the assessment 150 of the extent to which input image data 2 match predefined distribution 1, according to block 154.

According to block 152, a score ascertained by the discriminator for reconstructed image data 2* may be included in the assessment 150 of the extent to which input image data 2 match predefined distribution 1.

According to block 153, based on a comparative assessment of reconstructed image data 2* on the one hand and input image data 2 on the other hand, an evaluation may be made of the extent to which input image data 2 match predefined distribution 1 or deviate from this distribution 1. This comparative assessment may, according to block 153*a*, comprise a measure of the similarity between reconstructed image data 2* and input image data 2. According to block 153*b*, the comparative assessment may comprise a measure of the similarity between reconstructed image data 2* and input image data 2 in a pre-learned feature space.

The result 150*a* of assessment 150 is checked in step 160 to ascertain whether input image data 2 match predefined distribution 1. If this is the case (truth value 1), in step 190 a control signal 190*a* is ascertained from the output of the production network for these input image data. In step 200, image classifier 50, driving assistance system 60, robot 70, system 80 for at least partially automated driving or system 90 for the visual monitoring of areas is controlled using this control signal 190*a*.

If, on the other hand, input image data 2 do not match predefined distribution 1 (truth value 0), it may be checked in step 170 whether the transformation 3 used to generate information-reduced data 2* corresponds to a property of input image data 2 which is relevant in the context of applying the production network. If this is not the case (truth value 0), input image data 2 may then be processed further in the same manner as if they matched predefined distribution 1.

If, on the other hand, transformation 3 corresponds to a property of input image data 2 which is relevant in the context of applying the production network (truth value 1 at step 170), various measures may be taken to prevent disadvantageous effects on the operation of system 50, 60, 70, 80, 90, using the output of the production network.

According to block 171, using the production network, a warning may be issued to a user of the respective system 50, 60, 70, 80, 90.

According to block 172, the respective system 50, 60, 70, 80, 90 may be caused to activate at least one additional sensor and to use measurement data ascertained using this sensor for a plausibility check and/or correction of an output of the production network.

According to block 173, an output of the production network for the input image data 2 in question may be suppressed.

According to block 174, system 50, 60, 70, 80, 90 may be deactivated using the production network.

Figure 2:
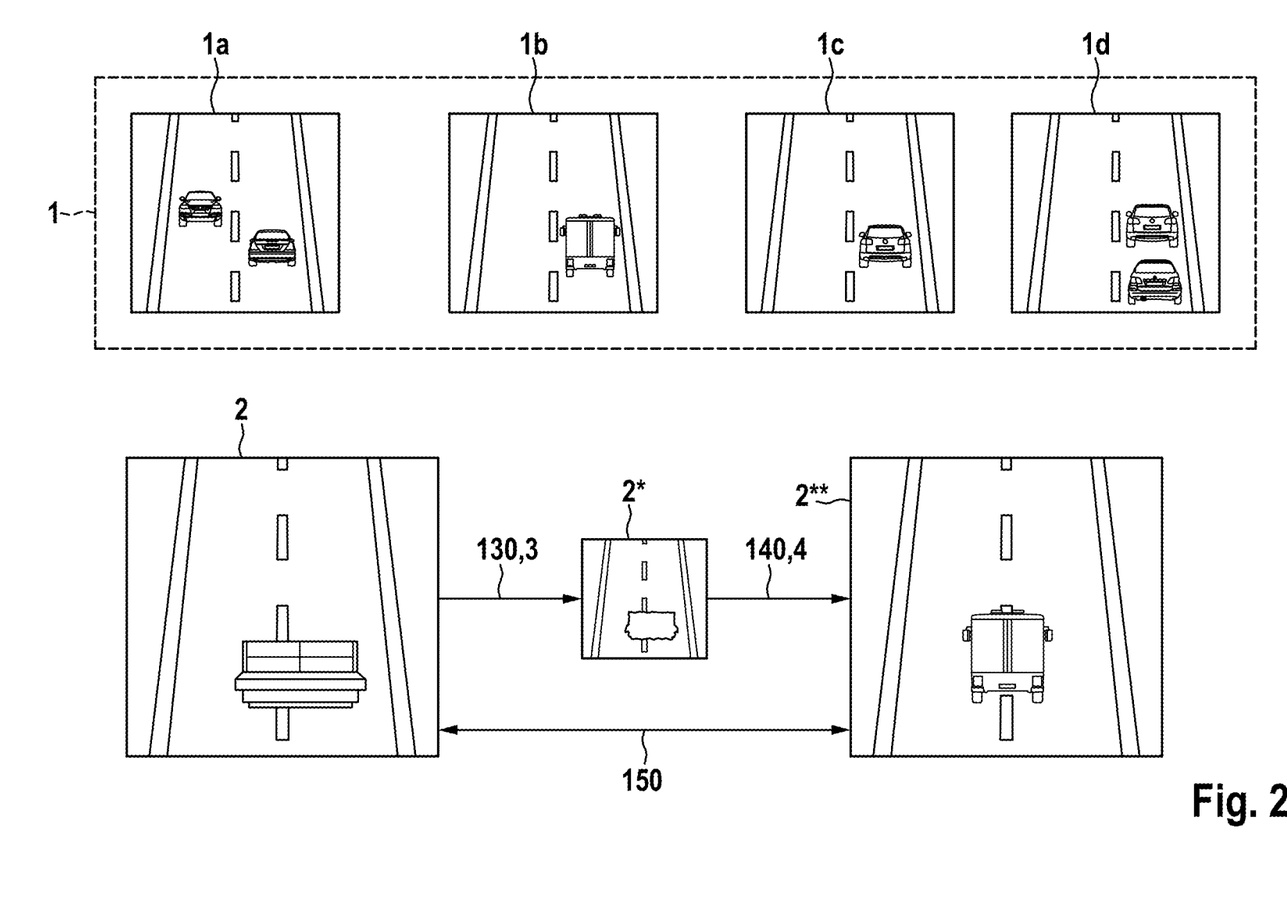
FIG. 2 shows an example of the detection of the fact that image data 2 of a traffic situation do not match a predefined distribution 1, according to the present invention.

FIG. 2 provides an example to show how the method 100 described above may be used to detect the fact that image data 2 of a traffic situation do not match a predefined distribution 1.

In the example shown in FIG. 2, predefined distribution 1 comprises images each showing a road on which one or more vehicles are driving. Four such images 1*a*-1*d* are shown in FIG. 2 by way of example. Images 1*a*-1*d* differ in respect of which types of vehicles are to be seen where on the road. In images 1*a*, 1*c* and 1*d*, the vehicles are all cars; in image 1*b*, a truck is visible as the vehicle.

Input image data 2 now show a road on which there is a sofa, which a driver has lost as a result of defective load securing. If these input image data 2 are converted to information-reduced data 2* by scaling them down markedly as transformation 3 in step 130, the sofa there becomes a hazy structure, which can no longer be readily identified as a sofa. If reconstructed image data 2* are ascertained therefrom in step 140 using neural reconstruction network 4, neural reconstruction network 4 will reconstruct the hazy structure into some object which it already knows. According to distribution 1, these are vehicles. Thus, at the point where input image data 2 contain a sofa, reconstructed image data 2* contain a truck. This discrepancy indicates that input image data 2 do not belong to predefined distribution 1.

What is claimed is:

1. A method for detecting anomalies in input image data from a camera, by detecting to what extent the input image data match at least one predefined distribution of image data or deviate from the predefined distribution, the method comprising the following steps:
   providing at least one transformation, which maps input image data to data that have been information-reduced with regard to at least one aspect;
   providing at least one neural reconstruction network, which is trained to reconstruct original image data from information-reduced data which were obtained by applying the transformation to the original image data from the predefined distribution;
   mapping the input image data to information-reduced data by applying the transformation;
   mapping the information-reduced data to reconstructed image data using the neural reconstruction network; and
   assessing, using the reconstructed image data, to what extent the input image data match the predefined distribution or deviate from the predefined distribution, wherein a score ascertained by a discriminator for the reconstructed image data is included in the assessing.

2. The method as recited in claim 1, wherein the transformation includes:
   scaling down to a lower resolution, and/or
   removing color information, and/or
   sorting pixels according to brightness values, and/or
   modifying random pixels, and/or
   adding image contents, and/or
   leveling differences in brightness, and/or
   aggregating image information over spatial sub-areas of the image data, and/or
   removing image information items selected according to a predefined criterion, and/or
   selecting and centering an image portion from the image data.

3. The method as recited in claim 1, wherein the neural reconstruction network is a generative neural reconstruction, and generating of the reconstructed image data is conditioned on the information-reduced data.

4. The method as recited in claim 1, wherein a generator which has been trained together with the discriminator as a generative adversarial network (GAN) is the neural reconstruction network.

5. The method as recited in claim 1, wherein, based on a comparative assessment of the reconstructed image data on the one hand and the input image data on the other hand, the assessment of the extent to which the input image data match the predefined distribution or deviate from the predefined distribution, is made.

6. The method as recited in claim 5, wherein the comparative assessment includes a measure of a similarity between the reconstructed image data and the input image data.

7. The method as recited in claim 5, wherein the comparative assessment includes a measure of a similarity between the reconstructed image data and the input image data in a pre-learned feature space.

8. The method as recited in claim 1, wherein:
   a distribution of image data on which at least one neural production network in a predefined image classifier or driving assistance system or robot or system for at least partially automated driving or system for the visual monitoring of areas, has been trained is selected as the predefined distribution; and
   image data provided for processing by the neural production network are selected as the input image data.

9. The method as recited in claim 8, wherein, in response to the input image data being assessed as deviating from the predefined distribution, the input image data are earmarked for a further training of the production network.

10. The method as recited in claim 8, wherein, in response to the input image data being assessed as matching the predefined distribution:
    a control signal is ascertained from an output of the production network for the input image data; and
    the predefined image classifier or driving assistance system or robot or system for at least partially automated driving or system for the visual monitoring of areas is controlled using the control signal.

11. A method for detecting anomalies in input image data from a camera, by detecting to what extent the input image data match at least one predefined distribution of image data or deviate from the predefined distribution, the method comprising the following steps:
    providing at least one transformation, which maps input image data to data that have been information-reduced with regard to at least one aspect;
    providing at least one neural reconstruction network, which is trained to reconstruct original image data from information-reduced data which were obtained by applying the transformation to the original image data from the predefined distribution;
    mapping the input image data to information-reduced data by applying the transformation;
    mapping the information-reduced data to reconstructed image data using the neural reconstruction network; and
    assessing, using the reconstructed image data, to what extent the input image data match the predefined distribution or deviate from the predefined distribution
    wherein the at least one transformation includes a plurality of different respective transforms, and by applying the different respective transformations, a plurality of respective information-reduced versions are generated from the same input image data,
    each respective information-reduced version of the plurality of information-reduced versions is mapped to a respective reconstructed version using a neural reconstruction network corresponding to the respective transformation; and
    the respective reconstructed versions are included in the assessment.

12. A method for detecting anomalies in input image data from a camera, by detecting to what extent the input image data match at least one predefined distribution of image data or deviate from the predefined distribution, the method comprising the following steps:
    providing at least one transformation, which maps input image data to data that have been information-reduced with regard to at least one aspect;
    providing at least one neural reconstruction network, which is trained to reconstruct original image data from information-reduced data which were obtained by applying the transformation to the original image data from the predefined distribution;
    mapping the input image data to information-reduced data by applying the transformation;
    mapping the information-reduced data to reconstructed image data using the neural reconstruction network; and assessing, using the reconstructed image data, to what extent the input image data match the predefined distribution or deviate from the predefined distribution, wherein a generator which has been trained together with a discriminator as a generative adversarial network (GAN) is the neural reconstruction network, wherein a score ascertained by the discriminator for the reconstructed image data is included in the assessment.

13. A method for detecting anomalies in input image data from a camera, by detecting to what extent the input image data match at least one predefined distribution of image data or deviate from the predefined distribution, the method comprising the following steps:
providing at least one transformation, which maps input image data to data that have been information-reduced with regard to at least one aspect;
providing at least one neural reconstruction network, which is trained to reconstruct original image data from information-reduced data which were obtained by applying the transformation to the original image data from the predefined distribution;
mapping the input image data to information-reduced data by applying the transformation;
mapping the information-reduced data to reconstructed image data using the neural reconstruction network; and
assessing, using the reconstructed image data, to what extent the input image data match the predefined distribution or deviate from the predefined distribution, wherein:
the neural reconstruction network is further trained with the input image data;
the information-reduced data are mapped to further reconstructed image data using the further-trained neural reconstruction network; and
the further reconstructed image data are also included in the assessment.

14. A method for detecting anomalies in input image data from a camera, by detecting to what extent the input image data match at least one predefined distribution of image data or deviate from the predefined distribution, the method comprising the following steps:
providing at least one transformation, which maps input image data to data that have been information-reduced with regard to at least one aspect;
providing at least one neural reconstruction network, which is trained to reconstruct original image data from information-reduced data which were obtained by applying the transformation to the original image data from the predefined distribution;
mapping the input image data to information-reduced data by applying the transformation;
mapping the information-reduced data to reconstructed image data using the neural reconstruction network; and
assessing, using the reconstructed image data, to what extent the input image data match the predefined distribution or deviate from the predefined distribution, wherein:
a distribution of image data on which at least one neural production network in a predefined image classifier or driving assistance system or robot or system for at least partially automated driving or system for the visual monitoring of areas, has been trained is selected as the predefined distribution;
image data provided for processing by the neural production network are selected as the input image data,
wherein, in response to the input image data being assessed as deviating from the predefined distribution:
it is checked whether the transformation used corresponds to a property of the input image data which is relevant in the context of applying the production network; and, if this is the case:
using the production network, a warning is issued to a user of the respective system, and/or
the predefined image classifier or driving assistance system or robot or system for at least partially automated driving or system for the visual monitoring of areas is caused to activate at least one additional sensor and to use measurement data ascertained using the additional sensor for a plausibility check and/or correction of an output of the production network; and/or
an output of the production network is suppressed for the input image data; and/or
the predefined image classifier or driving assistance system or robot or system for at least partially automated driving or system for the visual monitoring of areas is deactivated using the production network.

15. A non-transitory machine-readable data carrier on which is stored a computer program for detecting anomalies in input image data from a camera, by detecting to what extent the input image data match at least one predefined distribution of image data or deviate from the predefined distribution, the computer program, when executed by one or more computers, causing the one or more computers to perform the following steps:
providing at least one transformation, which maps input image data to data that have been information-reduced with regard to at least one aspect;
providing at least one neural reconstruction network, which is trained to reconstruct original image data from information-reduced data, which were obtained by applying the transformation to original image data from the predefined distribution;
mapping the input image data to information-reduced data by applying the transformation;
mapping the information-reduced data to reconstructed image data using the neural reconstruction network; and
assessing, using the reconstructed image data, to what extent the input image data match the predefined distribution or deviate from the predefined distribution, wherein a score ascertained by a discriminator for the reconstructed image data is included in the assessing.

16. One or more computers configured to detect anomalies in input image data from a camera, by detecting to what extent the input image data match at least one predefined distribution of image data or deviate from the predefined distribution, the one or more computers configured to:
provide at least one transformation, which maps input image data to data that have been information-reduced with regard to at least one aspect;
provide at least one neural reconstruction network, which is trained to reconstruct original image data from information-reduced data, which were obtained by applying the transformation to original image data from the predefined distribution;
map the input image data to information-reduced data by applying the transformation;
map the information-reduced data to reconstructed image data using the neural reconstruction network; and assess, using the reconstructed image data, to what extent the input image data match the predefined distribution or deviate from the predefined distribution, wherein a score ascertained by a discriminator for the reconstructed image data is included in the assessment.

\* \* \* \* \*